Jan. 26, 1932. C. G. CUNNINGHAM 1,842,825
SHUT-OFF AND MIXING VALVE
Filed Feb. 27, 1926
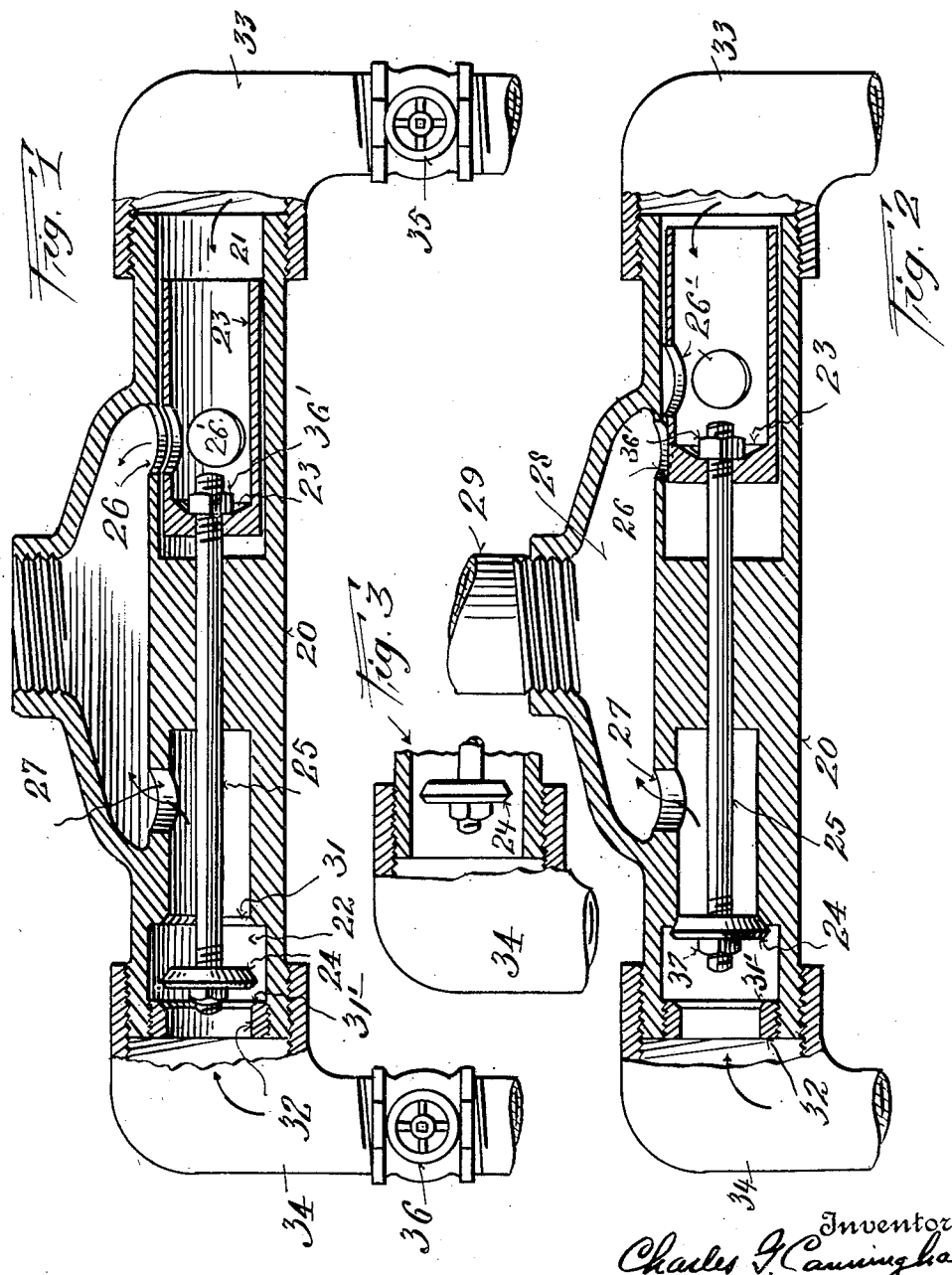

Patented Jan. 26, 1932

1,842,825

UNITED STATES PATENT OFFICE

CHARLES G. CUNNINGHAM, OF PORTCHESTER, NEW YORK

SHUT-OFF AND MIXING VALVE

Application filed February 27, 1926. Serial No. 91,018.

This invention relates to an improved valve structure which operates primarily to control the relative flow of a plurality of fluid streams and either completely or in definite proportions, cuts off, or restricts one or more passages for the flow of said fluid streams.

The object of my invention accordingly is to provide a structure which operates as a shut-off valve or as a mixing valve for a plurality of fluids, as hot and cold water, different chemicals, gases and such like. Another object includes the provision of a control and cut-off valve which is simple in construction, certain in operation and readily installed in the usual pipe systems of bath rooms, bath houses or laundries and in chemical plants. A further object includes the provision of a construction which renders impossible accidental scalding in baths and particularly shower baths or whereby an excessive flow of hot water is impossible. A still further object includes the provision of a valve structure of the type stated which is pressure controlled and governed by either a single control valve or by the combined effect of more than a single control valve.

Other objects will appear hereinafter and I attain these objects by the construction illustrated in the accompanying drawings in which,—

Fig. 1 is a sectional view in elevation of a construction embodying the principles of my invention and showing the control valves wide open.

Fig. 2 is a view similar to Fig. 1, but with the control valve in closed position; and Fig. 3 is a sectional view of a portion of the valve structure slightly modified.

Like numerals refer to similar parts throughout the several views.

By way of an example I will now describe the application of my valve to shower baths. In the use of such baths with hot and cold water, it not infrequently happens that the hot water only is turned on with most serious results. It is the prime purpose of my invention to provide a construction which will render impossible the flow of hot water when the cold water is turned off or is not flowing. The construction is so designed, that it is impossible to deliver hot water only. My construction further provides means for regulating the flow of different liquids, or of hot and cold water, as the case may be, and to mix the different liquids, or the hot and cold water, in any desired proportions. I accomplish these and other desired results by the construction herein illustrated as an example merely and not in a limiting sense.

As a practical embodiment of my invention I provide a valve block 20, having valve chambers 21 and 22 in which operate respectively valves 23 and 24. Preferably one of said valves is cup shaped as valve 23 for example, and the other is the usual plain valve. These valves are united by a common rod 25 which is slidably held in the valve block 20, after the manner more fully set forth below.

Chambers 21 and 22 are each provided with an outlet 26 and 27 respectively and one of said outlets is controllable by one or more corresponding openings 26' in the walls of the cup shaped valve 23. In a preferred form of construction the outlets 26 and 27 open into a common mixing chamber 28 from whence the mixture is delivered by suitable means as a pipe 29 for any desired purpose. If the mixing valve is used for controlling the supply of hot and cold water, then will the pipe 29 deliver to a spray nozzle (not shown). Obviously the delivery may be made to suit conditions as for chemical plants or the like for laundry and other purposes.

In a preferred form of construction, chamber 22 is provided with shut off seats 31 and 31' against which, under certain conditions, valve 24 is seated to shut off the liquid supply which in this instance is hot water. Seat 31 is turned directly on the valve block and seat 31' may be formed by a screw threaded collar 32. In some instances, I prefer to omit entirely collar 32 and its shut off seat 31', as in Fig. 3 for example. The inner cut-off seat 31 is retained, however, in this type of construction. To supply the liquids for mixing, I provide each end of the block with a feed pipe 33 or 34, and these pipes are preferably provided with control valves 35 and 36 for regulating the liquid pressure on the valves 23 and 24. In practice, I make the effective surface of valve 23 somewhat larger than that of valve 24, so that in a water feed system, as for the control of hot and cold water, the mixing valve will be automatically controlled by valve 35 alone. For convenience of assembly and adjustment, nuts 36' and 37 are provided.

The shut-off and mixing valve is arranged to move freely back and forth in the valve block in response to variations of pressure on the opposing surfaces of the valves 23 and 24. Thus, for example if the structure is used for mixing hot and cold water for baths as in a shower, or for laundry purposes, my structure is designed to safeguard against scalding. For when the hot water valve 36 is opened without first opening the cold water valve 35, the valve 24 will automatically shut and assume the position shown in Figure 2. If the cold water valve is opened, either before or after the hot water valve 36 is opened, then will the mixing valve assume a position dependent on the differences of pressure on the two valves 23 and 24. And if both valves 35 and 36 are fully open, the system will assume a wide open position as is shown by Figure 1 for example. Water or other fluid will then flow in substantially equal quantities from 33 and 34 into the mixing chamber 28 to be thence delivered where desired. By diminishing the pressure on valve 23, the valve 24 will assume a position between wide open and shut in direct ratio with the pressures.

While I have specifically applied my construction to the mixing of cold and hot water, it is obvious that other fluids are similarly miscible by use of my improved valve.

What I claim, therefore, as new and useful and of my own invention and desire to secure by Letters Patent is:

1. In a valve structure for controlling a plurality of fluid streams, a valve block having a pair of cylindrical chambers within said block and extending in the same direction, a valve operating in each of said chambers, a rigid connection for positively uniting said valves and two seats in one of said cylindrical chambers, either of said seats being closed by the same valve and serving as a positive cut-off for a fluid stream.

2. A valve structure comprising a valve block having a mixing chamber in communication with separate fluid control chambers, a cup shaped valve in one of said chambers, a flat valve in the other of said chambers, a tie member to hold united said valves, and a seat for said flat valve whereby liquid flow past said valve is shut off when said valve is moved to an extreme position when fluid pressure is supplied to the cup shaped valve only.

In testimony whereof I have hereunto set my hand on this 25th day of February A. D., 1926.

CHARLES G. CUNNINGHAM.